(12) United States Patent
Volk et al.

(10) Patent No.: US 12,409,731 B2
(45) Date of Patent: Sep. 9, 2025

(54) COOLING PERFORMANCE INDICATOR

(71) Applicant: Bayerische Motoren Werke Aktiengesellschaft, Munich (DE)

(72) Inventors: Tobias Volk, Sulzemoos (DE); Rosario Davide Bruno, Munich (DE); Andreas Klemm, Munich (DE); Ludwig Schirmacher, Oxford (GB)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 499 days.

(21) Appl. No.: 17/846,483

(22) Filed: Jun. 22, 2022

(65) Prior Publication Data

US 2023/0415579 A1     Dec. 28, 2023

(51) Int. Cl.
| | |
|---|---|
| *B60L 1/02* | (2006.01) |
| *B60K 11/02* | (2006.01) |
| *G01K 3/00* | (2006.01) |
| *G01K 13/02* | (2021.01) |
| *G07C 5/08* | (2006.01) |

(52) U.S. Cl.
CPC ............... *B60L 1/02* (2013.01); *B60K 11/02* (2013.01); *G01K 3/005* (2013.01); *G01K 13/026* (2021.01); *G07C 5/0808* (2013.01)

(58) Field of Classification Search
CPC ........ B60L 1/02; G01K 13/026; G01K 3/005; B60K 11/02; G07C 5/0808
See application file for complete search history.

(56) References Cited

U.S. PATENT DOCUMENTS

| | | | |
|---|---|---|---|
| 11,274,595 B1* | 3/2022 | Farhat | F01P 5/02 |
| 2006/0185626 A1* | 8/2006 | Allen | F02M 26/28 |
| | | | 123/41.31 |
| 2006/0288967 A1* | 12/2006 | Joyce | F01P 7/167 |
| | | | 123/41.11 |
| 2013/0075075 A1* | 3/2013 | Tokuda | B60H 1/00278 |
| | | | 165/202 |
| 2014/0062228 A1* | 3/2014 | Carpenter | B60K 11/02 |
| | | | 310/53 |
| 2014/0338376 A1* | 11/2014 | Carpenter | B60H 1/00392 |
| | | | 62/115 |
| 2017/0174094 A1* | 6/2017 | Meitinger | B60L 58/26 |
| 2020/0240869 A1* | 7/2020 | Yesh | G01M 3/38 |
| 2022/0402349 A1* | 12/2022 | Eser | B60K 11/02 |
| 2023/0406070 A1* | 12/2023 | Zheng | B60H 1/2218 |
| 2023/0415579 A1* | 12/2023 | Volk | B60L 1/003 |

* cited by examiner

*Primary Examiner* — Peter D Nolan
*Assistant Examiner* — Wae L Louie
(74) *Attorney, Agent, or Firm* — Crowell & Moring LLP

(57) ABSTRACT

A cooling system for a vehicle includes a processing device configured to determine a coolant system status based on a coolant temperature and determine whether the coolant system status exceeds a coolant system status threshold. The processing device is also configured to determine a thermal load status of at least one electrical component of the vehicle and determine whether the thermal load status exceeds a thermal load status threshold. The processing device is also configured to output a first cooling performance indicator in response, at least in part, to determining that the coolant system status exceeds the coolant system status threshold and that the thermal load status exceeds the thermal load status threshold, the first cooling performance indicator indicating an issue with the cooling system.

19 Claims, 6 Drawing Sheets

COOLING PERFORMANCE INDICATOR

FIELD

This disclosure relates to cooling systems for electrical components in vehicles, and more particularly to cooling performance indicators for cooling systems in electric vehicles and hybrid vehicles.

BACKGROUND

Electric vehicles (EVs) and hybrid vehicles (HVs), such as plug-in hybrid vehicles (PHEVs) and mild hybrid electric vehicles (MHEVs), are increasingly commonplace. Such vehicles include multiple electric components, such as electric motors, starter-generators, inverters, and controllers, that generate large amounts of heat and require cooling to remain functional and efficient. Typically, as the temperatures of such components increase beyond certain temperatures, the components become derated such that their functional efficiency is reduced, and the components can ultimately temporarily or permanently fail due to excessive heat. This reduces the efficiency of EVs, and can result in higher reliance on the combustion engine in HVs. Such negative outcomes serve to undercut the primary purpose of EVs and HVs, which is to improve energy efficiency.

Various regulatory boards, such as the California Air Resource Board (CARB), have implemented a requirement for performing a functional check of the cooling system performance and outputting a notification regarding such performance. While existing systems comply with such regulations regarding notification of cooling system performance, there is a desire to provide information on the performance of the cooling system with improved detail or specificity.

SUMMARY

To address these and other concerns, an improved cooling system for electrical components in a vehicle is disclosed. In accordance with various embodiments, cooling system includes at least processing device that is configured to determine a coolant system status based, at least in part, on a coolant temperature of coolant in the cooling system, and determine whether the coolant system status exceeds a coolant system status threshold. The processing device is also configured to determine a thermal load status of at least one electrical component of the vehicle cooled by the cooling system and determine whether the thermal load status exceeds a thermal load status threshold. The electrical component may be an inverter, a controller, a charge control unit, an autonomous driving control unit, a battery, or a starter-generator. The processing device is also configured to output a first cooling performance indicator in response, at least in part, to determining that the coolant system status exceeds the coolant system status threshold and that the thermal load status exceeds the thermal load status threshold, the first cooling performance indicator indicating an issue with the cooling system.

In some embodiments, the cooling system also includes a coolant temperature sensor that measures the coolant temperature of the coolant in the cooling system at an exit of a coolant cooler. The processing device is then further configured to receive the coolant temperature from the coolant temperature sensor and determine the coolant system status based, at least in part, on the coolant temperature and also, in some embodiments, an ambient temperature and a vehicle speed. In some embodiments, the cooling system also includes an electrical component temperature sensor that measures a temperature of the electrical component. The processing device is then also configured to receive the temperature of the electrical component and determine the thermal load status based on the temperature of the electrical component.

In some embodiments, the cooling system also includes a cooling system component, such as a cooling fan, a coolant pump, or a shutter flap. The processing device is further configured to determine that the cooling system component has failed, output a second cooling performance indicator in response, at least in part, to determining that the cooling system component has failed, the second cooling performance indicator indicating a cooling system component failure, and prevent output of the first cooling performance indicator. In this manner, the system may provide a more specific performance indicator that provides information that one of the cooling components of the cooling system has failed, rather than the general first cooling performance indicator for the entire cooling system.

In certain embodiments, the processing device may be configured to output a third cooling performance indicator in response, at least in part, to determining that the coolant system status does not exceed the coolant system status threshold and that the thermal load status of the at least one electrical component exceeds the thermal load status threshold. The third cooling performance indicator indicates an issue with cooling of the at least one electrical component. In this manner, individual third cooling performance indicators specific to each electrical component may be output that indicate an issue with cooling of that electrical component rather than the general first cooling performance indicator for the entire cooling system. In various approaches, the processing device is configured to output the first, second, and/or third cooling performance indicators by setting a diagnostic trouble code in an on-board diagnostics (OBD) system of the vehicle.

As such, an improved cooling system provides additional details regarding issues within the cooling system, including specific indications of particular component cooling failures. This leads to greater efficiency in diagnosing and repairing such cooling systems, as well as improved detection of coolant system issues.

Other objects, advantages and novel features of the present invention will become apparent from the following detailed description of one or more preferred embodiments when considered in conjunction with the accompanying drawings.

DETAILED DESCRIPTION OF THE DRAWINGS

Existing cooling systems utilize information from one electrical component, such as the inverter, to determine cooling system performance. For example, existing systems may rely principally on the temperature of the inverter, analyzing temperature increases and decreases of the inverter. However, typically, cooling systems have parallel cooling paths, and such analysis based principally on the temperature from one component (e.g., the inverter) in one of those parallel cooling paths may provide only limited information on the performance of the cooling system as a whole. For example, if cooling path that includes the inverter is blocked, then existing systems could identify that there is an issue with the cooling system as a whole (e.g., based on the increased temperature of the inverter), but would only indicate that the entire cooling system is experiencing problems and may not be able to indicate specifically that the cooling path of the inverter is having an issue. Similarly, if a different component (e.g., in a different branch of the cooling system) is experiencing cooling problems, while the inverter does not experience such cooling problems, the existing system may not be able to identify that such an issue with the cooling system exists as the inverter is operating without issue. Similarly, because the cooling system performance is based principally on the temperature of this one component (e.g., the inverter), it is also difficult to determine if a temperature increase of that component is due to a cooling system failure or due to the operational state or function of that component.

Figure 1:
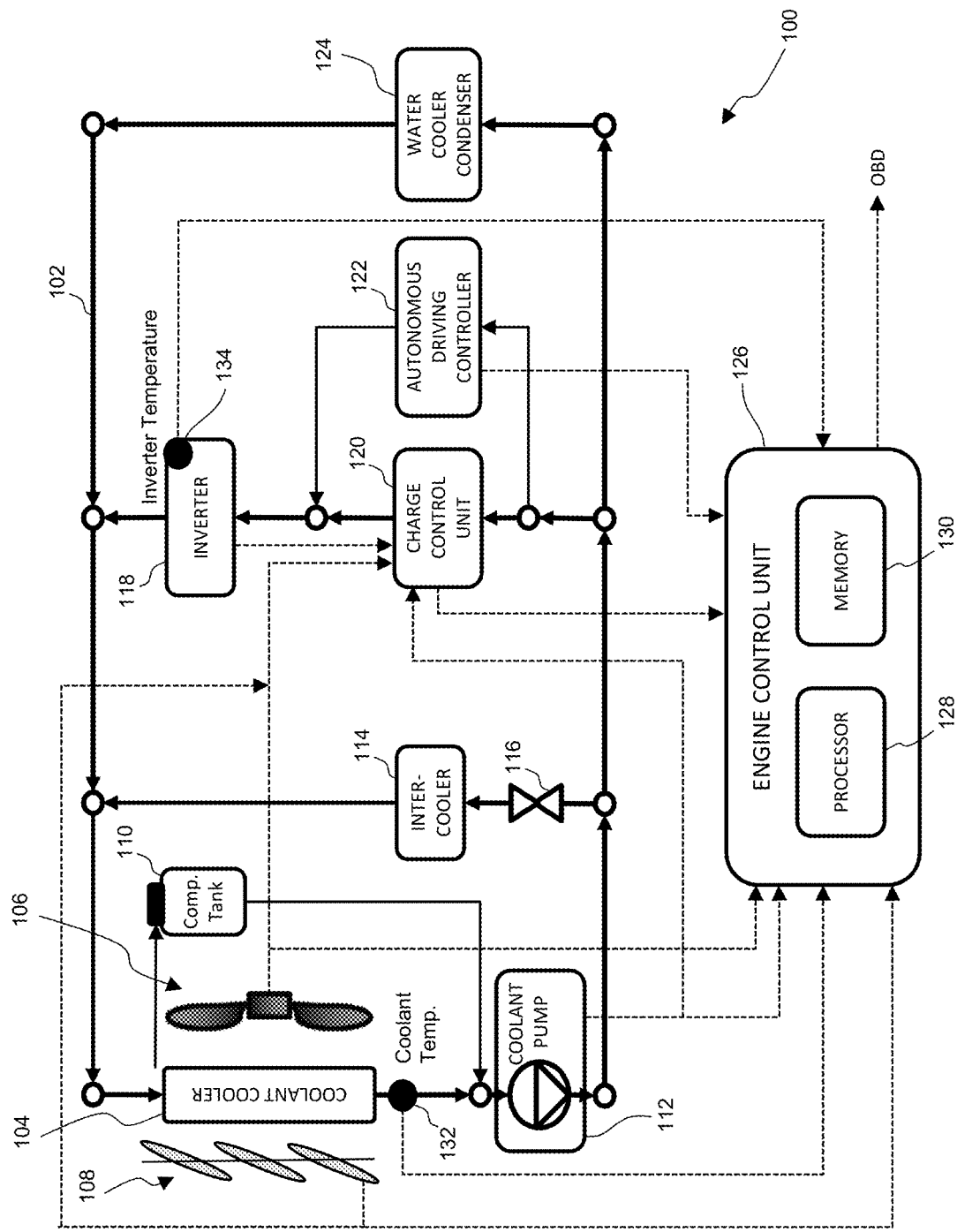
FIG. 1 is a schematic representation of a cooling system in accordance with various embodiments.

FIG. 1 is a schematic representation of a cooling system 100 implementing improved cooling performance analysis and reporting in accordance with various embodiments. In various embodiments, the cooling system 100 of FIG. 1 may be for an electric vehicle (EV) or a hybrid vehicle (HV), such as a plug-in hybrid electric vehicle (PHEV). The cooling system 100 includes a coolant circuit 102 that includes a plurality of pathways (e.g., hoses, etc.) through which coolant fluid can pass, thereby cooling a plurality of electrical components of a vehicle. These pathways may include multiple parallel branches through which the coolant can pass. The cooling system 100 may include a coolant cooler 104 through which heated coolant within the circuit 102 passes and is cooled, for example, by ambient air. A fan 106 may be included, which moves cool air across the coolant cooler 104 to further reduce the temperature of the coolant therein. An air vent shutter 108 (including a shutter controller) may also be included, which can be opened or closed to allow more or less air to pass through the coolant cooler 104. A compensation tank 110 may also be included within the system 100. A coolant pump 112 pumps the coolant through the circuit 102 so that the cooled coolant passes through the pathways and hoses, past the various electrical component of the vehicle such that the coolant absorbs the heat generated by those electrical components, and back to the coolant cooler 104 to remove the heat from the coolant and cool the coolant.

In various embodiments, the cooling system 100 may include an intercooler 114, which may include a valve 116 to control the flow of coolant to the intercooler. The cooling system 100 may also include an inverter 118, a charge control unit (CCU) 120, an autonomous driving controller 122, and a water cooler condenser 124. The inverter 118 may convert DC electric power (e.g., stored in a battery) into AC power via semiconductor switches to control and power an electric motor of the vehicle. The CCU 120 may control charging of the inverter 118 or other components, and may also control cooling of the entire electrical cooling system 100. The autonomous driving controller 122 may control and implement all or some autonomous driving functions of the vehicle. Each of these components generate heat which must be removed in order for the component to remain efficient and functioning. The coolant in the circuit 102 may pass through or over each of these electrical components to remove the heat generated by these electrical components.

The cooling system 100 may include or be coupled to an engine control unit (ECU) 126. The ECU 126 may include a (e.g., one or more) processing device 128 that is coupled to a (e.g., one or more) memory 130, for example, with a data bus. The processing device 128 may be a Central Processing Unit (CPU), microcontroller, or a microprocessor, and/or may include or be implemented with an Application Specific Integrated Circuit (ASIC), Programmable Logic Device (PLD), or Field Programmable Gate Array (FPGA). The processing device 128 and/or the ECU 126 as a whole may also be implemented with circuitry that includes discrete logic or other circuit components, including analog circuit components, digital circuit components or both. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. The memory 130 may comprise a flash memory, a Random Access Memory (RAM), a Read Only Memory (ROM), an Erasable Programmable Read Only Memory (EPROM), a Hard Disk Drive (HDD), other magnetic or optical disk, or another machine-readable non-volatile medium or other tangible storage mediums other than a transitory signal. The memory 130 may store therein software modules, code, and/or instructions that, when executed by the processing device 128, cause the processing device 128 to implement some or all of the processes described herein or illustrated in the drawings. The memory 130 may also store other data for use by the processing device 128 and/or historical information regarding the operation of the ECU 126, other components, and or the vehicle as a whole. The CCU 120, autonomous driving controller 122, power control unit 204 (see FIGS. 2 and 3), and starter-generator 302 (see FIG. 3) may each also include a similar processor and memory as discussed directly above.

In various embodiments, the ECU 126 provides an On-Board Diagnostics (OBD) function, which can output diagnostic trouble codes (DTC) to a compatible reader system. These DTC codes may be stored in the memory 130, for example as flags, upon detection of a triggering condition and may be saved until cleared by a compatible reader system or expiration of time. In various embodiments herein, a cooling performance indicator is provided as a DTC code through the OBD system. In various approaches, the cooling performance indicator may indicate an issue with the cooling system as a whole, with a cooling system component (such as the fan 106, shutter 108, or pump 112), which may include, for example, different DTC codes for each identified issue type. These different cooling performance indicators may be triggered according to different cooling system performance analysis processes as disclosed herein.

As part of the processes of analyzing the performance of the cooling system 100, additional data is captured, determined, transferred between the different electrical components (e.g., via a vehicle bus system such as a CAN bus or via other known data transmission methods), and processed. For example, the cooling system 100 also includes one or more coolant temperature sensors 132 within the circuit 102. In various embodiments, the coolant temperature sensor 132 is located at or near the outlet of the coolant cooler 104 such that it measures the temperature of the coolant as it exits the coolant cooler 104 or shortly thereafter. However, the coolant temperature sensor 132 may be located at other or additional locations within the circuit 102. Similarly, the inverter 118 may include one or more inverter temperature sensors 134 that measure the temperature of the inverter 118. Other electrical components may include similar temperature sensors to measure the temperature of each component, including, for example, the CCU 120, the autonomous driving controller 122, the power control unit 204 (see FIGS. 2 and 3), and/or the battery 202 (which includes battery temperature sensor 206) (see FIGS. 2 and 3).

As shown in FIG. 1, the coolant temperature sensor 132 may provide a temperature of the coolant (or other related information) to the ECU 126, though it may provide such data to other electrical components such as the CCU 120. Similarly, the inverter 118 may provide an inverter temperature (taken with the inverter temperature sensor 134) and/or a thermal load status of the inverter 118 derived from the inverter temperature to the ECU 126 and/or the CCU 120. Similarly, the autonomous driving controller 122, the power control unit 204 (see FIGS. 2 and 3), and/or the battery 202 (see FIGS. 2 and 3) may also provide temperatures and/or determined thermal load statuses for each component to the CCU 120 and/or the ECU 126. Similarly still, the CCU 120 may provide its temperature and/or determined thermal load status to the ECU 126. In certain embodiments, all of some of the electrical components provide temperatures and/or determined thermal load statuses for each component to the CCU 120, and the CCU 120 in turn provides that data or other data related to the temperatures and/or determined thermal load statuses, to the ECU 126.

Additionally, cooling system components, such as the fan 106, the controller of the air vent shutter 108, the coolant pump 112, or the valve 116 may provide operational status information to the CCU 120 and/or the ECU 126. Specifically, the fan 106, the controller of the air vent shutter 108, the coolant pump 112, and/or the valve 116 may provide present functional status info (e.g., present speed of the fan 106, opening amount of the shutter 108, speed of the coolant pump 112, open amount of the valve 116), as well as diagnostic fault information indicating whether the fan 106, the air vent shutter 108, the coolant pump 112, or valve 116 are operating correctly or are failing or have failed.

Figure 2:
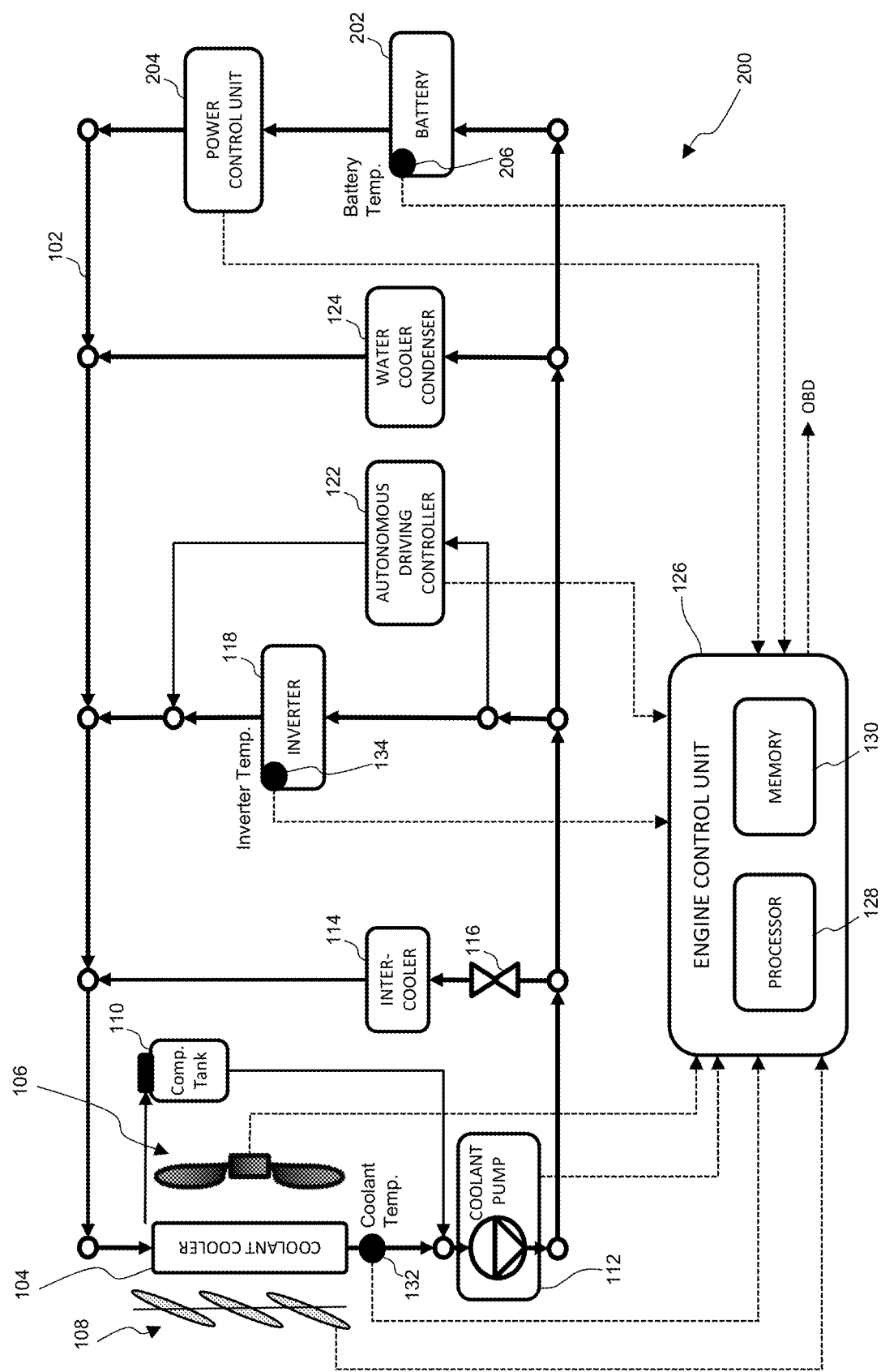
FIG. 2 is another schematic representation of another cooling system in accordance with various embodiments.
Figure 3:
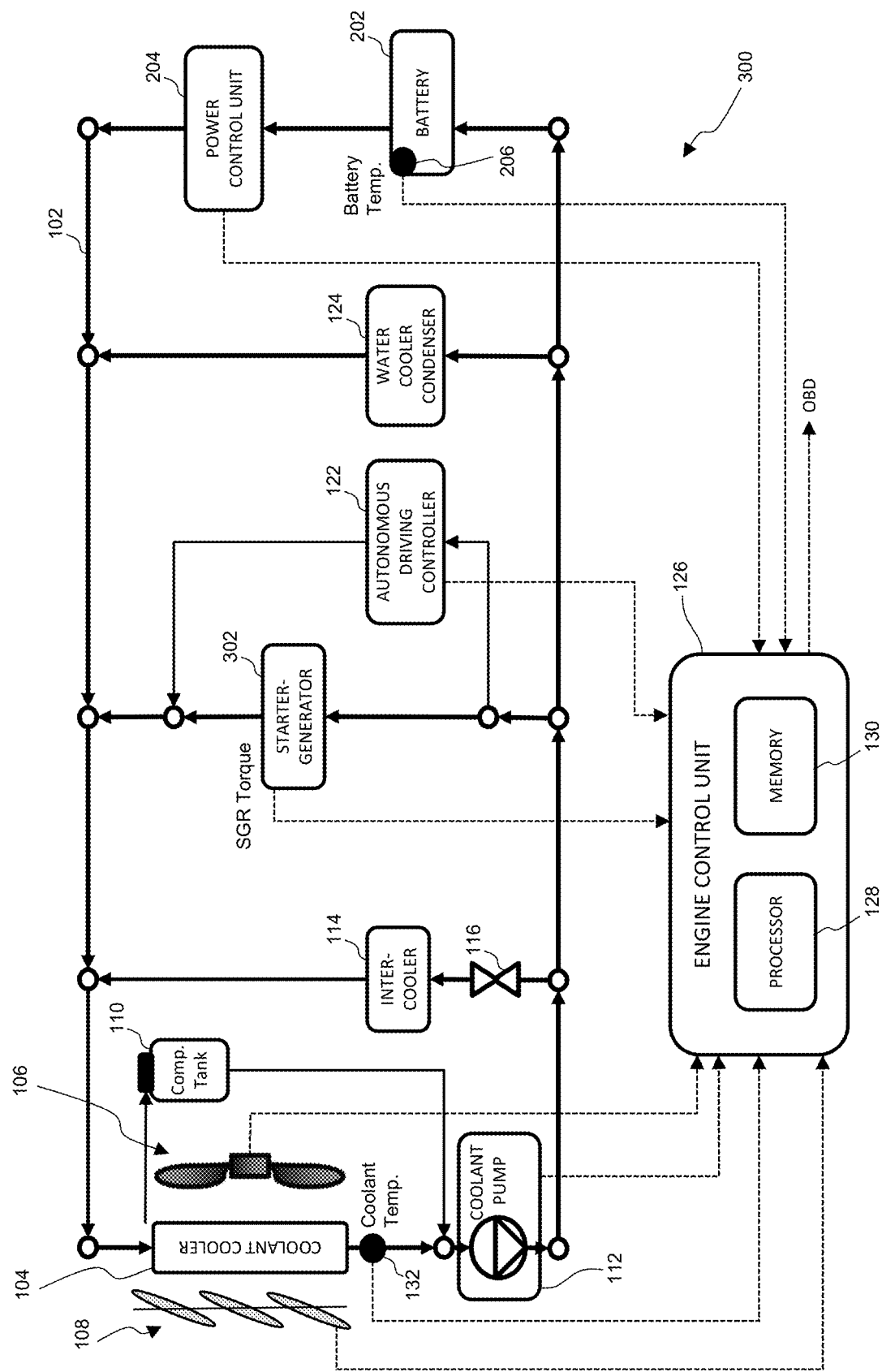
FIG. 3 is another schematic representation of another cooling system in accordance with various embodiments.

FIG. 2 is another schematic representation of a cooling system 200 that is a variation of the cooling system 100 of FIG. 1 in accordance with various embodiments. FIG. 3 is another schematic representation of another cooling system 300 that is a variation of the cooling system 100 of FIG. 1 and the cooling system 200 of FIG. 2 in accordance with various embodiments. The cooling systems 200 and 300 of FIGS. 2 and 3 may be for mild hybrid electric vehicle (MHEV), and may include a lower voltage battery 202 (e.g., 48V) to provide power. A power control unit 204 is also included, which controls the flow of power to and from the battery 202. In various embodiments, the battery 202 and the power control unit 204 may be cooled by the cooling system, as is shown by the coolant pathways of the cooling circuit 102. As mentioned above, the battery 202 and the power control unit 204 may include temperature sensors, such as battery temperature sensor 206, to measure the temperature of each component. Similarly, the battery 202 and the power control unit 204 may provide temperatures and/or determined thermal load statuses for each component to the ECU 126.

While the cooling system 200 of FIG. 2 includes the inverter 118, the cooling system 300 of FIG. 3 may include a starter-generator 302 that receives power from and generates power to be stored in the battery 202. In various embodiments, the starter-generator 302 may provide a torque signal to the ECU 126 (or to other controllers) indicating the amount of torque the starter-generator 302 is outputting. Similarly, the starter-generator 302 may also provide a rotational speed signal and/or a temperature signal to the ECU 126 (or to other controllers). The remainder of the cooling systems 200 and 300 of FIGS. 2 and 3 are similar to the system 100 of FIG. 1, and similar or identical components are numbered the same in each figure.

Operational processes and configurations of the processing devices (e.g., the processing device 128) of the cooling system 100 are provided below. Specifically, processes for triggering output of a cooling performance indicator (e.g., a DTC in certain embodiments) are disclosed. Although cooling system 100 is reference below, it is understood that some or all of these processes are implemented in each cooling system 100, 200, and 300. Also, although the processor 128 of the ECU 126 is generally described as being configured to execute the processes discussed herein, other processing devices of the various electrical components described herein, or other processing devices of other control units or electrical systems, may likewise be configured to execute all or some of the disclosed processes. Similarly, execution of the processes disclosed herein may involve different processing devices of different electrical components executing different portions of the disclosed processes.

Figure 4:
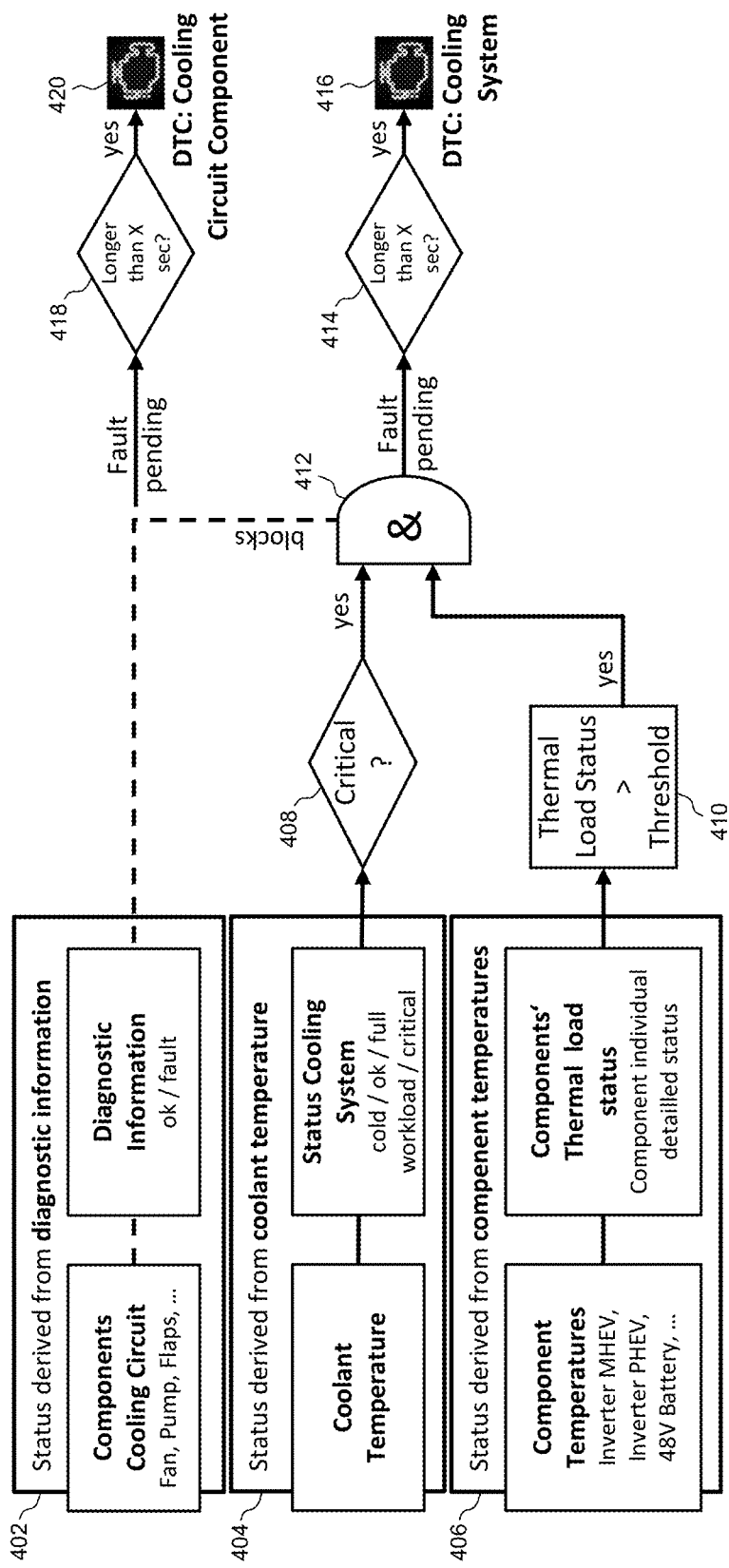
FIG. 4 is logic flow diagram illustrating various functions and methods of outputting a coolant performance indicator in accordance with various embodiments.

FIG. 4 is logic flow diagram illustrating various functions and methods of outputting a coolant performance indicator, which the one or more processing devices of the system may be configured to execute, in accordance with various embodiments. As shown at 404, the at least one processing device (e.g., processing device 128) may be configured to determine a coolant system status based, at least in part, on a coolant temperature of coolant in the cooling system 100. The at least one processing device may receive the coolant temperature from the coolant temperature sensor 132, which may be configured to measure the coolant temperature of the coolant in the cooling system 100 at an exit of a coolant cooler 104. The processing device may determine the coolant system status based, at least in part, on the coolant temperature, an ambient temperature, and a vehicle speed. For example, the cooling system status may be one or more levels (e.g., four levels, including cold, OK, full workload, and critical), which status level may be determined based on a mapping of the coolant temperature, an ambient temperature, and a vehicle speed. The mapping may be determined based on a lookup table stored in the memory (e.g., memory 130) or may be continuously or periodically computed based on one or more equations. In a specific approach, coolant temperature thresholds are set to define the different status levels, and the thresholds are adjusted based on the vehicle speed and the ambient temperature. These thresholds may also be set based in part on the mileage of the vehicle.

Next, at 406, the at least one processing device is configured to determine a thermal load status of at least one electrical component of the vehicle cooled by the cooling system 100, which may include an inverter 118, a controller, a charge control unit 120, an autonomous driving controller 122, a battery 202, a power control unit 204, a starter-generator 302, or another component. This may be performed by the processing device of the ECU 126 or a processing device of the CCU 120. Alternatively, this may be performed by a processing device associated or included with the electrical component may be configured to determine the thermal load status of that electrical component itself. In this case, the individual electrical components may then communicate its determined thermal load status to the CCU 120 and/or the ECU 126 for further processing. The individual electrical components may include an electrical component temperature sensor configured to measure a temperature of the electrical component, such as, for example, the inverter temperature sensor 134 or the battery temperature sensor 206. The at least one processing device is configured to receive the temperature of the at least one electrical component and determine the thermal load status based on the temperature of the at least one electrical component.

Like the coolant system status, the thermal load status may have one or more status levels which are mapped to the measured temperature (or multiple measured temperatures of the component if more than one sensor is included), for example, cold, OK, at capacity, critical, and derating. Each electrical component may have its own mapping, particularly for a critical or derating status level. For example, the battery 202 may suffer derating at 55° C., while the inverter 118 may suffer derating at 70-90° C. As such, they have different individual temperature mappings for their thermal load status.

During normal operation, these thermal load statuses may be used to control the cooling system 100, including the speed of the coolant pump 112 or the fan 106, or the opening or closing of the shutter 108. For example, when one or more component thermal load statuses indicate that the component is approaching or at a critical level, then the cooling system 100 may maximize the speed of the coolant pump 112 and the fan 106, and may ensure the shutter 108 is fully open. If such operations do not lower the thermal load status of the component, then the electrical component may then enter a state that impacts efficiency and the at least one processing device (e.g., the processing device 128 of the ECU 126) may have to flag the issue using a cooling performance indicator (e.g., a DTC).

Next, at 408, the at least one processing device is configured to determine whether the coolant system status exceeds a coolant system status threshold. In a specific example, it determines if the coolant system status is at a critical level. The coolant system may reach a critical level in response to different issues within the coolant system, such as for example, a blocked cooler or a wrong cooling fluid, or other issues that affect operations of the cooling system. Also, at 410, the at least one processing device is configured to determine whether a thermal load status for one of the electrical components cooled by the cooling system exceeds a thermal load status threshold. If the answer to both of these inquiries is yes (at 412), then the at least one processing device may determine that a fault has occurred and will determine that the fault is pending. This pending fault can lead to the processing device outputting and/or storing in the memory a first cooling performance indicator (e.g., DTC 416) indicating an issue with the cooling system 100. Put another way, the processing device can output the first cooling performance indicator (e.g., DTC 416) in response, at least in part, to determining that the coolant system status exceeds the coolant system status threshold (at 408) and that the thermal load status exceeds the thermal load status threshold (at 410). In various approaches, for the first cooling performance indicator (e.g., DTC 416) to be output, the processing device must determine that a fault pending duration of time exceeds a fault pending threshold time. In this instance, then the processing device may then output the first cooling performance indicator (e.g., DTC 416) in response, at least in part, to also determining that the fault pending duration of time exceeds the fault pending threshold time (at 414).

Thus, in an instance where the coolant system status is critical, and at least one component thermal load status is critical, and they both remain critical for a fault pending threshold time (e.g., 1 minute) to ensure that the problem is not merely a short peak, the processing device will output the first cooling performance indicator, for example, by setting a DTC in an OBD system of the vehicle.

In certain embodiments, at 402, the at least one processing device may also determine an operational status of a cooling system component (such as the fan 106, shutter 108, or pump 112), specifically determining if a cooling system component has failed. If such a cooling system component has failed, the at least one processing device may output a second cooling performance indicator in response, at least in part, to determining that the cooling system component has failed. The second cooling performance indicator may be a DTC 420 indicating a cooling system component failure. In various embodiments, the second cooling performance indicator may one or more of a plurality of various DTCs that separately relate to the different components or issues so that pinpointing a problem is possible. Further, the DTC for each component may include information indicating what kind of error exists, for example, such as an electrical issue (short to ground/plus) or plausibility errors (offset/stuck/out of range). In various examples, each of these different failure types may have its own DTC. In one approach, the at least one processing device may also determine, at 418, that the cooling system component has failed for a component failure duration of time that exceeds a component failure pending threshold time. In this approach, the at least one processing device is configured to then output the second cooling performance indicator in response, at least in part, to also determining that the component failure duration of time exceeds the component failure threshold time. This again ensures that the fault detected with the cooling system component is not merely a transitory issue.

Additionally, the processing device may be configured to prevent or block output of the first cooling performance indicator (e.g., DTC 416). This is because the root cause of the coolant system issue may be limited to failure of that particular cooling system component, rather than a different issue with the cooling system, such as a blocked pipe. Thus, instead of the general first cooling performance indicator (e.g., DTC 416) for the entire cooling system, a more specific second cooling performance indicator (e.g., DTC 420) can be provided that indicates there is an issue with the cooling system component.

Figure 5:
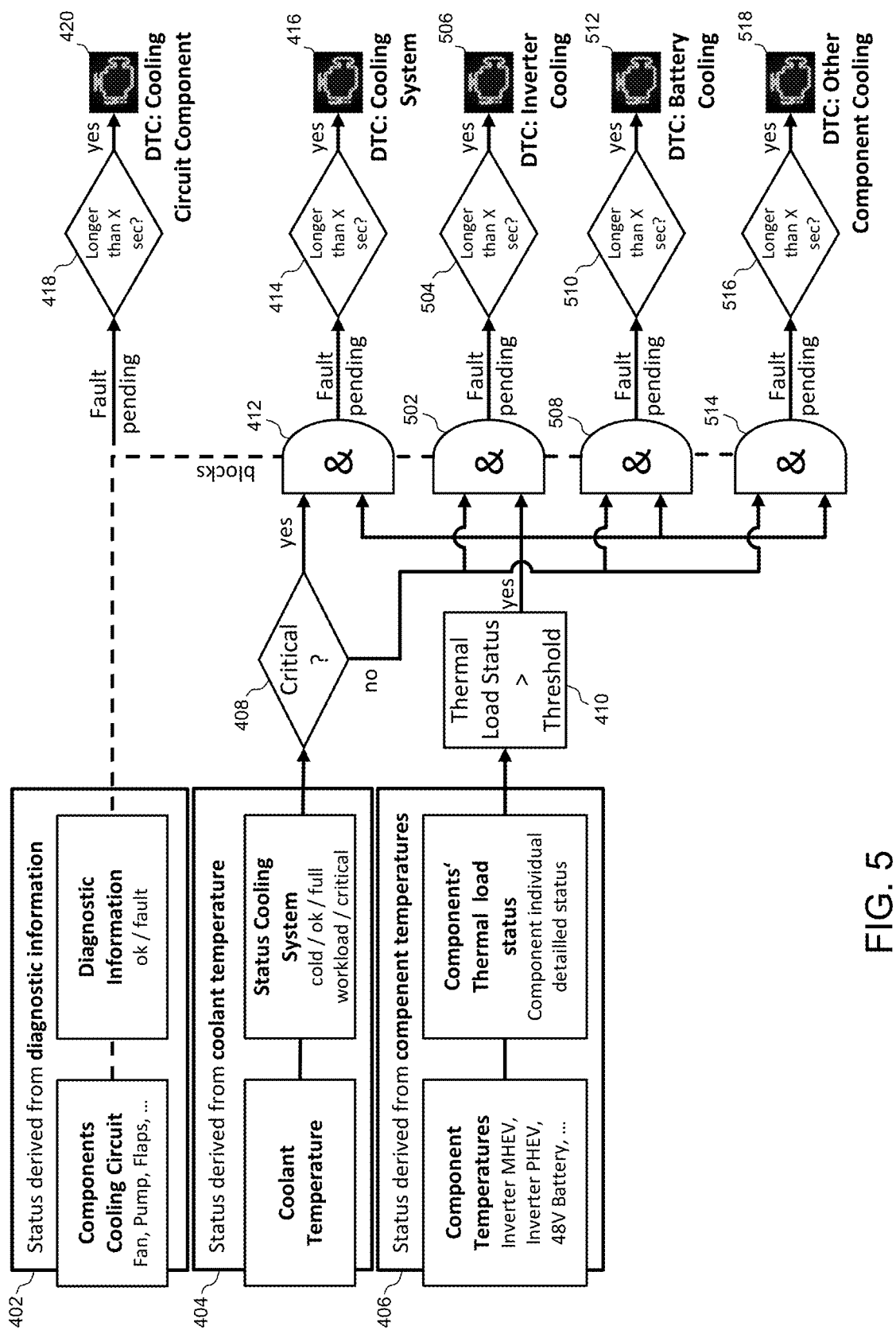
FIG. 5 is another logic flow diagram illustrating variations of the functions and methods disclosed in FIG. 4 in accordance with various embodiments.

FIG. 5 is another logic flow diagram illustrating additional functions and methods, which the one or more processing devices of the system may be configured to execute, in accordance with various embodiments. FIG. 5 merely adds features to those shown in FIG. 4, and as such, FIG. 4 is wholly encompassed by FIG. 5. In FIG. 5, the added functions are to determine cooling system failures specific to each electrical component cooled by the cooling system. More specific third cooling performance indicators specific to each electrical component may be output that indicate an issue with cooling of that electrical component. Such component-specific cooling issues may result from, for example, a blocked pathway or leak on a particular coolant branch for that component, or other issues that affect the cooling of that electrical component, but may not generally affect the cooling of other electrical components.

As shown at 408, the at least one processing device (e.g., processing device 128) may be configured to determine that the coolant system status does not exceed the coolant system status threshold. However, even in a situation where the coolant system status is not critical (e.g., the coolant temperature is not too high for the ambient temperature and speed of the vehicle), the at least one processing device may determine that one or more electrical components has a thermal load status that exceeds the threshold (e.g., critical). In this case, the at least one processing device may output a third cooling performance indicator (e.g., DTC 506, 512, 518) in response, at least in part, to determining (at 502, 508, or 514) that the coolant system status does not exceed the coolant system status threshold and that a thermal load status of the at least one electrical component does exceed the thermal load status threshold.

Each electrical component may trigger its own third cooling performance indicator (e.g., DTC). For example, as shown in FIG. 5, if the thermal load status of the inverter 118 exceeds the threshold for the inverter 118 (e.g., critical) at 410, while the coolant system status remains under the critical threshold at 408, then, at 502, the at least one processing device will determine that a fault is pending with respect to the cooling of the inverter 118. Similarly, if the thermal load status of the battery 202 exceeds the threshold for the battery 202 (e.g., critical) at 410, while the coolant system status remains under the critical threshold at 408, then, at 508, the at least one processing device will determine that a fault is pending with respect to the cooling of the battery 202. Similarly still, if the thermal load status of a different electrical component (e.g., the CCU 120, the autonomous driving controller 122, the power control unit 204, or the starter-generator 302) exceeds a threshold for that electrical component (e.g., critical) at 410, while the coolant system status remains under the critical threshold at 408, then, at 514, the at least one processing device will determine that a fault is pending with respect to the cooling of that electrical component. Any of these pending faults can lead to the processing device outputting and/or storing in the memory a third cooling performance indicator specific to that electrical component (e.g., DTC 506, 512, or 518).

In various approaches, for the third cooling performance indicator (e.g., DTC 506, 512, or 518) to be output for each electrical component, the at least one processing device must determine that a second fault pending duration of time exceeds a second fault pending threshold time at 504, 510, or 516. In various embodiments, each electrical component may have a different second fault pending threshold time. For example, the temperature and thermal load status of the inverter 118 can change rapidly, and its fault pending threshold time may be as short as 15 seconds at 504. However, the battery 202 may change temperatures much more slowly, and as such, its fault pending threshold time may be 5 minutes or more at 510. If the second fault pending duration of time exceeds the second fault pending threshold time for that electrical component (at 504, 510, or 516), then the processing device may output the respective third cooling performance indicator (e.g., DTC 506, 512, or 518) in response, at least in part, to also determining that the second fault pending duration of time exceeds the second fault pending threshold time.

In various approaches, the at least one processing device may also be configured to determine that a coolant pump speed exceeds a coolant pump speed threshold. If so, the processing device may output the third cooling performance indicator (e.g., DTC 506, 512, or 518) in response, at least in part, to also determining that the coolant pump speed exceeds the coolant pump speed threshold. This ensures that the cooling issue with the particular electrical component is not caused by a lack of coolant flow due to speed of the coolant pump 112 that is too low. This situation does not represent a problem with the cooling system, but instead represents a problem with the present coolant pump speed setting, which may be remedied by increasing the speed of the coolant pump 112. Each electrical component may have a different coolant pump speed threshold that is required in order to trigger output of the third cooling performance indicator (e.g., DTC 506, 512, or 518). If the coolant pump speed is below the threshold, then the processing device will block output of the third cooling performance indicator. However, as soon as pump speed increases above the threshold, if the thermal load is still above the threshold for that component (while the coolant system status is still below critical), then the fault pending timing begins, which is then compared against the second fault pending threshold time for that electrical component (at 504, 510, or 516).

Figure 6:
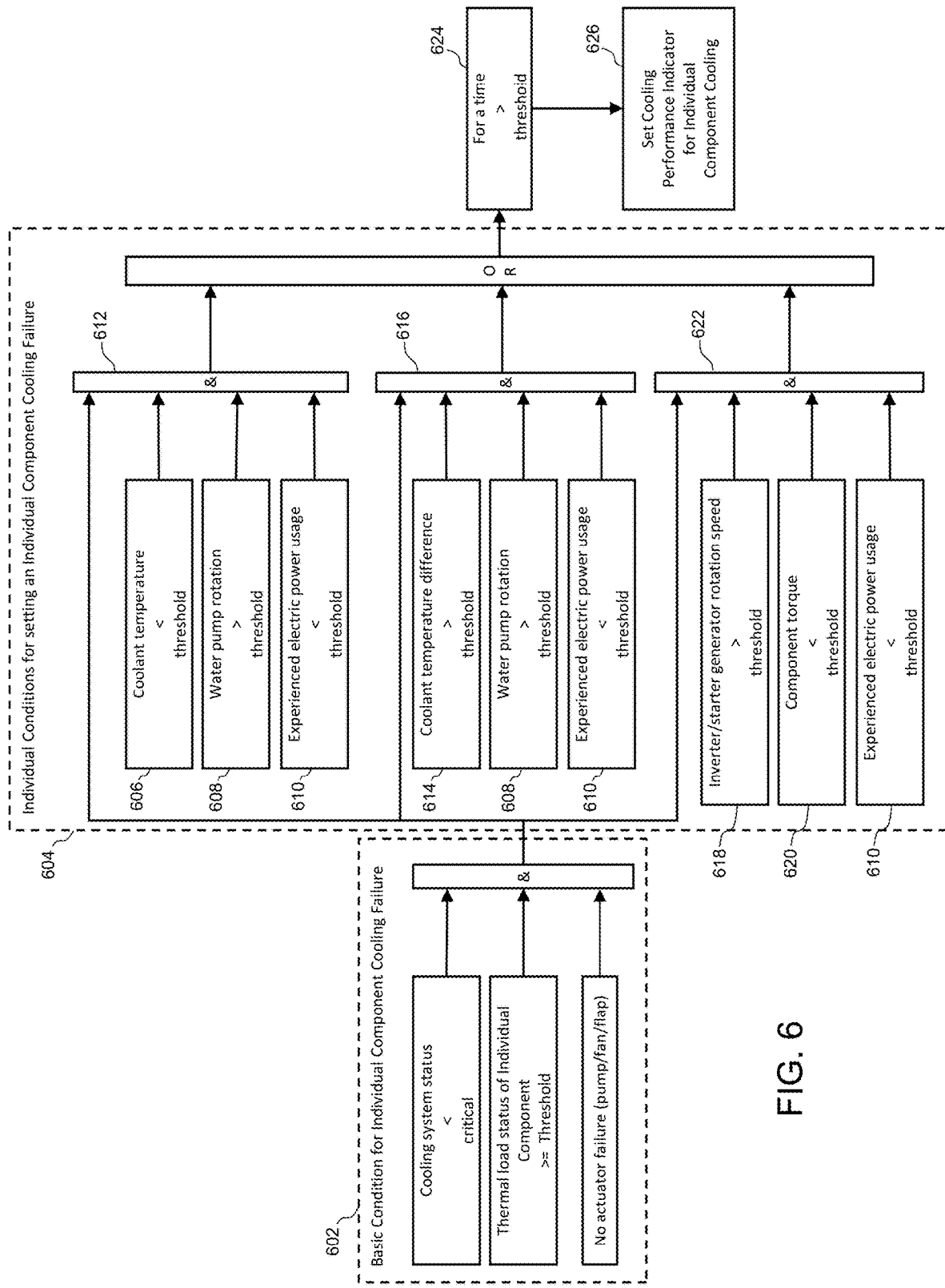
FIG. 6 is another logic flow diagram illustrating variations of the functions and methods disclosed in FIG. 5 in accordance with various embodiments.

FIG. 6 is another logic flow diagram illustrating variations of the functions and methods disclosed in FIG. 5, which the one or more processing devices of the system may be configured to execute, in accordance with various embodiments. FIG. 6 illustrates additional considerations that may be determined prior to outputting a cooling performance indicator (e.g., DTC 506, 512, or 518) for an individual electrical component. The considerations and determinations illustrated in step 604 of FIG. 6 may occur as part of each step 502, 508, and/or 514 prior to determining that a fault is pending (except for steps 618, 620, and 622, which are applicable only to rotating electrical components, such as an electric motor or the starter-generator 302).

At 602, the basic conditions for detecting an individual electrical component cooling issue are provided, which are largely duplicative of those shown in FIG. 5. Specifically, the at least one processing device determines that the coolant system status does not exceed the coolant system status threshold (as in 408 in FIG. 5), that the thermal load status of at least one electrical component exceeds the thermal load status for that electrical component (as in 410 in FIG. 5). Further, no cooling component has failed (as in 402 in FIG. which may result instead in the output of the second cooling performance indicator (e.g., DTC 420), and would block output of one of the third cooling performance indicators (e.g., DTC 506, 512, or 518). If these conditions are true for a particular electrical component, then the analysis moves to consideration of individual conditions for setting such individual component cooling failure indicators.

In various embodiments, a first check is performed at 612. As part of this first check 612, at 606, the at least one processing device determines whether the coolant temperature is above or below a non-critical temperature threshold while the coolant system status does not exceed the coolant system status threshold. Because the coolant system status is also based on the ambient temperature and vehicle speed, a very high coolant temperature may not cause the coolant system status to enter the critical level, for example, if it is very hot outside. Thus, a very high coolant temperature may simply be the result of the environment rather than a failure of the coolant system as a whole, and thus, the coolant system status may remain below critical despite the high coolant temperatures. However, such high coolant temperatures may still be at or near derating temperatures for various electrical components, and may fail to cool those electrical components so that the thermal load status of that electrical component may exceed the thermal load status threshold (as in 410 in FIG. 5). However, because this high coolant temperature is caused by the environment rather than a failure with the cooling system, it would be improper to output a cooling performance indicator (e.g., DTC 506, 512, or 518) for that particular component. Thus, in order to output the third cooling performance indicator for a particular electrical component, the coolant temperature must be below a non-critical temperature threshold, which may be different for each electrical component (e.g., based on their derating temperatures). Conversely, if it is determined that the coolant temperature is above the non-critical temperature threshold while the coolant system status does not exceed the coolant system status threshold, then the at least one processing device can prevent output of the third cooling performance indicator.

At 608, the at least one processing device determines that the coolant pump speed exceeds the coolant pump speed threshold for that particular electrical component, as discussed above.

At 610, the at least one processing device determines that the electric component experienced a power usage exceeding a high power usage threshold within a period of time directly preceding determining that the thermal load status of the at least one electrical component exceeds a thermal load status threshold. High power usage (e.g., during high acceleration) can generate temporary spikes in temperatures of the electrical components (such that the thermal load status of the electrical component exceeds the threshold for that component). The system accounts for those temporary temperature spikes by allowing the power usage of the component to return to normal and waiting for a cooling period of time to determine if the component is still experiencing a critical thermal load status before outputting the third cooling performance indicator. Put another way, the at least one processing device will responsively prevent output of the third cooling performance indicator for a cooling period of time. Conversely, if the electric component has not experienced a power usage exceeding the high power usage threshold, then the processing device may continue with outputting the third cooling performance indicator (upon meeting the other conditions). The cooling period of time is determined by how long the component takes to reach a state where it has not experienced a high power usage plus the second fault pending threshold time (which may be set individually for each component).

In one approach, the at least one processing device determines the power usage by calculating a mean value of power usage by that electrical component over a period of time (e.g., 30 seconds, though can be different and can be individual for different electrical components). If the mean value of the power usage is greater than a threshold for each individual component, then the processing device increments a power usage counter. If the mean value is below the threshold, then the power usage counter is decremented. If the power usage counter exceeds a counter threshold (e.g., 5), then the processing device determines that the electrical component experienced a power usage exceeding the high power usage threshold. The processing device can also increment or decrement the power usage counter by more than 1 (e.g., 2-5) depending on how high the mean value of power usage was over (or under) the threshold for the timeframe. In various embodiments, power usage of one component (e.g., the inverter 118) may be inferred from power usage of another component (e.g., the battery 202).

Assuming these three conditions (606, 608, and 610, as well as the basic conditions of 602) are met for a second fault pending time that exceeds the second fault pending threshold time in 624 (which is the same as one of 504, 510, or 516), then the processing device may proceed with outputting the respective third cooling performance indicator (e.g., DTC 506, 512, or 518) at 626.

In various embodiments, a second check is performed at 616. As part of this second check 616, at 614, the at least one processing device is configured to determine a temperature difference between the coolant temperature and a temperature of the electrical component, and to determine whether the temperature difference exceeds a temperature delta threshold. If there is a high difference between the coolant temperature and the component, then an assumption may be made that there is a problem with cooling of the electrical component. Conversely, if the difference is low (e.g., because the coolant temperature is very high, even though the coolant system status is not critical), then there the assumption that there is a problem with the cooling system's cooling of that component because the temperatures are close to each other. Accordingly, the at least one processing device may output the third cooling performance indicator in response, at least in part, to also determining that the temperature difference exceeds the temperature delta threshold. Conversely, it may prevent output of the third cooling performance indicator in response, at least in part, to determining that the temperature difference does not exceed the temperature delta threshold.

The considerations for the coolant pump speed in 608 and the experienced electric power usage of the electrical component in 610 are included again in the second check 616. If these three conditions (614, 608, and 610, as well as the basic conditions of 602) are met for a second fault pending time that exceeds the second fault pending threshold time in 624 (which is the same as one of 504, 510, or 516), then the processing device may proceed with outputting the respective third cooling performance indicator (e.g., DTC 506, 512, or 518) at 626.

A third check 622 may be performed for electrical components that rotate, such as an electric motor or the starter-generator 302. In various embodiments, a direct temperature reading or thermal load status of such rotating components may not be available. Further, such rotating components may also be cooled by air in addition to the coolant in the circuit 102, where the air cooling is effected by the rotation of the component. Thus, at 618, the at least one processing device may determine that a rotational speed of at least one of an electric motor or a starter-generator is above a rotational speed threshold (e.g., such that it is being sufficiently cooled by air). This may be received from the starter-generator, or may be inferred from a known rotational speed of the combustion engine. Also, at 620, the at least one processing device may determine that a torque of the at least one of the electric motor or the starter-generator is below a torque threshold (e.g., such that it is not generating excessive amounts of heat). If these conditions are met, in addition to the experienced electric power usage being below the threshold in 610 (as well as the basic conditions of 602), for a second fault pending time that exceeds the second fault pending threshold time in 624 (which is the same as one of 504, 510, or 516), then the processing device may proceed with outputting the respective third cooling performance indicator (e.g., DTC 506, 512, or 518) at 626.

Additionally, in different approaches, for each different component, the system may be configured to perform only one, two, or all three of the first check 612, the second check 616, and/or the third check 622. Many variations are possible.

So configured, an improved cooling system is disclosed that provides additional details regarding issues within the cooling system, including providing cooling performance indicators that not only indicate a status of the cooling system as a whole, but also provide more specific indications of particular component cooling failures. This leads to greater efficiency in diagnosing and repairing such cooling systems, as well as improved detection of coolant system issues.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling system for cooling a plurality of electrical components of a vehicle, the cooling system comprising:
   a cooling circuit comprising a plurality of pathways through which coolant flows;
   a coolant pump configured to pump the coolant through the cooling circuit;
   a coolant cooler configured to cool the coolant flowing therethrough;
   at least one processing device configured to:
      determine a coolant system status based, at least in part, on a coolant temperature of the coolant in the cooling system;
      determine whether the coolant system status exceeds a coolant system status threshold;
      determine a thermal load status of at least one electrical component of the vehicle cooled by the cooling system;
      determine whether the thermal load status exceeds a thermal load status threshold;
      output a first cooling performance indicator in response, at least in part, to determining that the coolant system status exceeds the coolant system status threshold and that the thermal load status of the at least one electrical component exceeds the thermal load status threshold, the first cooling performance indicator indicating an issue with the cooling system;
      output a third cooling performance indicator in response, at least in part, to determining that the coolant system status does not exceed the coolant system status threshold and that the thermal load status of the at least one electrical component exceeds the thermal load status threshold, the third cooling performance indicator indicating an issue with cooling of the at least one electrical component; and
      control at least the coolant pump based at least in part on the coolant system status and the thermal load status.

2. The cooling system of claim 1, further comprising:
   a coolant temperature sensor configured to measure the coolant temperature of the coolant in the cooling system at an exit of the coolant cooler,
   wherein the at least one processing device is further configured to receive the coolant temperature from the coolant temperature sensor.

3. The cooling system of claim 1, wherein the at least one processing device is further configured to:
   determine the coolant system status based, at least in part, on the coolant temperature, an ambient temperature, and a vehicle speed.

4. The cooling system of claim 1, further comprising:
   an electrical component temperature sensor configured to measure a temperature of the at least one electrical component,
   wherein the at least one processing device is further configured to:
      receive the temperature of the at least one electrical component; and
      determine the thermal load status based on the temperature of the at least one electrical component.

5. The cooling system of claim 1, wherein the at least one processing device is further configured to:
   determine that the coolant system status exceeds the coolant system status threshold and that the thermal load status exceeds the thermal load status threshold for a fault pending duration of time that exceeds a fault pending threshold time; and
   output the first cooling performance indicator in response, at least in part, to also determining that the fault pending duration of time exceeds the fault pending threshold time.

6. The cooling system of claim 1, wherein the at least one processing device is configured to:
   output the first cooling performance indicator by setting a diagnostic trouble code in an on-board diagnostics (OBD) system of the vehicle.

7. The cooling system of claim 1, further comprising:
   a cooling system component of the cooling system,
   wherein the at least one processing device is further configured to:
      determine that the cooling system component has failed;
      output a second cooling performance indicator in response, at least in part, to determining that the cooling system component has failed, the second cooling performance indicator indicating a cooling system component failure; and
      prevent output of the first cooling performance indicator.

8. The cooling system of claim 7, wherein the cooling system component comprises at least one of a cooling fan, the coolant pump, or a shutter flap.

9. The cooling system of claim 7, wherein the at least one processing device is configured to:
   determine that the cooling system component has failed for a component failure duration of time that exceeds a component failure pending threshold time; and
   output the second cooling performance indicator in response, at least in part, to also determining that the component failure duration of time exceeds the component failure threshold time.

10. The cooling system of claim 1, wherein the at least one electrical component of the vehicle cooled by the cooling system comprises at least one of an inverter, a controller, a charge control unit, an autonomous driving control unit, a battery, or a starter-generator.

11. The cooling system of claim 1, wherein the at least one processing device is configured to:

determine that the coolant system status does not exceed the coolant system status threshold and that the thermal load status exceeds the thermal load status threshold for a second fault pending duration of time that exceeds a second fault pending threshold time; and output the third cooling performance indicator in response, at least in part, to also determining that the second fault pending duration of time exceeds the second fault pending threshold time.

12. The cooling system of claim 1, further comprising:
wherein the at least one processing device is configured to:
determine that a coolant pump speed exceeds a coolant pump speed threshold; and
output the third cooling performance indicator in response, at least in part, to also determining that the coolant pump speed exceeds the coolant pump speed threshold.

13. The cooling system of claim 1, wherein the at least one processing device is configured to:
determine whether the coolant temperature is above a non-critical temperature threshold while the coolant system status does not exceed the coolant system status threshold; and
prevent output of the third cooling performance indicator in response, at least in part, to determining that the coolant temperature is above the non-critical temperature threshold while the coolant system status does not exceed the coolant system status threshold.

14. The cooling system of claim 1, wherein the at least one processing device is configured to:
determine a temperature difference between the coolant temperature and a temperature of the at least one electrical component;
determine whether the temperature difference exceeds a temperature delta threshold;
output the third cooling performance indicator in response, at least in part, to also determining that the temperature difference exceeds the temperature delta threshold; and
prevent output of the third cooling performance indicator in response, at least in part, to determining that the temperature difference does not exceed the temperature delta threshold.

15. The cooling system of claim 1, wherein the at least one processing device is configured to:
determine that the at least one electric component experienced a power usage exceeding a high power usage threshold within a period of time directly preceding determining that the thermal load status of the at least one electrical component exceeds a thermal load status threshold; and
responsively prevent output of the third cooling performance indicator for a cooling period of time.

16. The cooling system of claim 1, wherein the at least one processing device is configured to:
determine that a rotational speed of at least one of an electric motor or a starter-generator is above a rotational speed threshold;
determine that a torque of the at least one of the electric motor or the starter-generator is below a torque threshold; and
output the third cooling performance indicator in response, at least in part, to also determining that the rotational speed is above the rotational speed threshold and that the torque is below the torque threshold.

17. A method for outputting a cooling performance indicator, the method comprising:
pumping coolant through a cooling circuit comprising a plurality of pathways and a coolant cooler using a coolant pump;
determining, by a controller, a coolant system status of a cooling system for cooling a plurality of electrical components of a vehicle based, at least in part, on a coolant temperature of the coolant in the cooling system, an ambient temperature, and a vehicle speed;
determining, by the controller, that the coolant system status exceeds a coolant system status threshold;
determining, by the controller, a thermal load status of at least one electrical component of the vehicle cooled by the cooling system;
determining, by the controller, that the thermal load status exceeds a thermal load status threshold;
outputting, by the controller, a cooling performance indicator in response, at least in part, to determining that the coolant system status exceeds the coolant system status threshold and that the thermal load status exceeds the thermal load status threshold, the cooling performance indicator indicating an issue with the cooling system; and
controlling at least the coolant pump based at least in part on the coolant system status and the thermal load status.

18. The method of claim 17, further comprising:
measuring the coolant temperature of the coolant in the cooling system with a coolant temperature sensor at an exit of the coolant cooler.

19. A method for outputting a cooling performance indicator, the method comprising:
determining, by a controller, a coolant system status of a cooling system for cooling a plurality of electrical components of a vehicle based, at least in part, on a coolant temperature of coolant in the cooling system;
determining, by the controller, that the coolant system status does not exceed a coolant system status threshold;
determining, by the controller, a thermal load status of at least one electrical component of the vehicle cooled by the cooling system;
determining, by the controller, that the thermal load status exceeds a thermal load status threshold;
outputting, by the controller, a cooling performance indicator in response, at least in part, to determining that the coolant system status does not exceed the coolant system status threshold and that the thermal load status exceeds the thermal load status threshold, the cooling performance indicator indicating an issue with cooling of the at least one electrical component; and
controlling at least a coolant pump of the cooling system based at least in part on the coolant system status and the thermal load status.

* * * * *